United States Patent [19]
Schurig

[11] Patent Number: 5,938,267
[45] Date of Patent: Aug. 17, 1999

[54] MOUNTING ARRANGEMENT FOR A WINDSHIELD OF A MOTOR VEHICLE

[75] Inventor: Darren R. Schurig, Laguna Beach, Calif.

[73] Assignee: Chrysler Corporation, Auburn Hills, Mich.

[21] Appl. No.: 08/915,221

[22] Filed: Aug. 20, 1997

Related U.S. Application Data

[60] Provisional application No. 60/035,769, Jan. 6, 1997.

[51] Int. Cl.$^6$ .................................................. B60J 1/02
[52] U.S. Cl. ........................ 296/96.2; 296/96.21; 49/246
[58] Field of Search ............................... 296/84.1, 86, 88, 296/92, 96.2, 96.21, 96.1; 49/339, 340, 341, 342, 246, 253; 74/63, 68

[56] References Cited

U.S. PATENT DOCUMENTS

| | | | |
|---|---|---|---|
| 1,546,256 | 7/1925 | Savage | 296/88 |
| 2,011,057 | 8/1935 | Kraft | 296/96.2 |
| 2,089,282 | 8/1937 | Macauley | 296/96.2 |
| 2,319,869 | 5/1943 | Kramer | 296/96.2 |
| 2,716,041 | 8/1955 | Coker | 296/96.2 |
| 2,919,155 | 12/1959 | Williams et al. | 296/96.2 |
| 5,833,298 | 11/1998 | Min | 296/96.2 X |

FOREIGN PATENT DOCUMENTS

| | | | |
|---|---|---|---|
| 362184920 | 8/1987 | Japan | 296/146.16 |
| 401175522 | 7/1989 | Japan | 296/146.16 |

OTHER PUBLICATIONS

Standard Catalog of 4 x 4's, A Comprehensive Guide to Four–Wheel Drive Vehicles Including Trucks, Vans, Sports Sedans and Sport Utility Vehicles, 1945–1993, pp. 385–386, 392, 398–401 (1993).

*Primary Examiner*—D. Glenn Dayoan
*Assistant Examiner*—Chad D. Wells
*Attorney, Agent, or Firm*—Mark P. Calcaterra

[57] ABSTRACT

A mounting arrangement for a windshield of a motor vehicle includes control linkage operable for articulating the windshield between a raised position and a lowered position such that an inner side of the windshield downwardly faces the vehicle hood when the windshield is in its lowered position. The mounting arrangement includes a first pair of control links which are pivotally interconnected at their first ends to the vehicle body and pivotally interconnected at their second ends to the windshield. Preferably, the mounting arrangement further includes a second pair of control links which are similarly pivotally interconnected at their respective first and second ends to the vehicle body and windshield. The mounting arrangement further includes a drive mechanism connected to one of the links of the first pair of control links and one of the links of the second pair of control links for driving the windshield between its raised position and lowered position. In one form, the drive mechanism includes a drive shaft and a drive motor operatively engaged with the drive shaft.

6 Claims, 5 Drawing Sheets

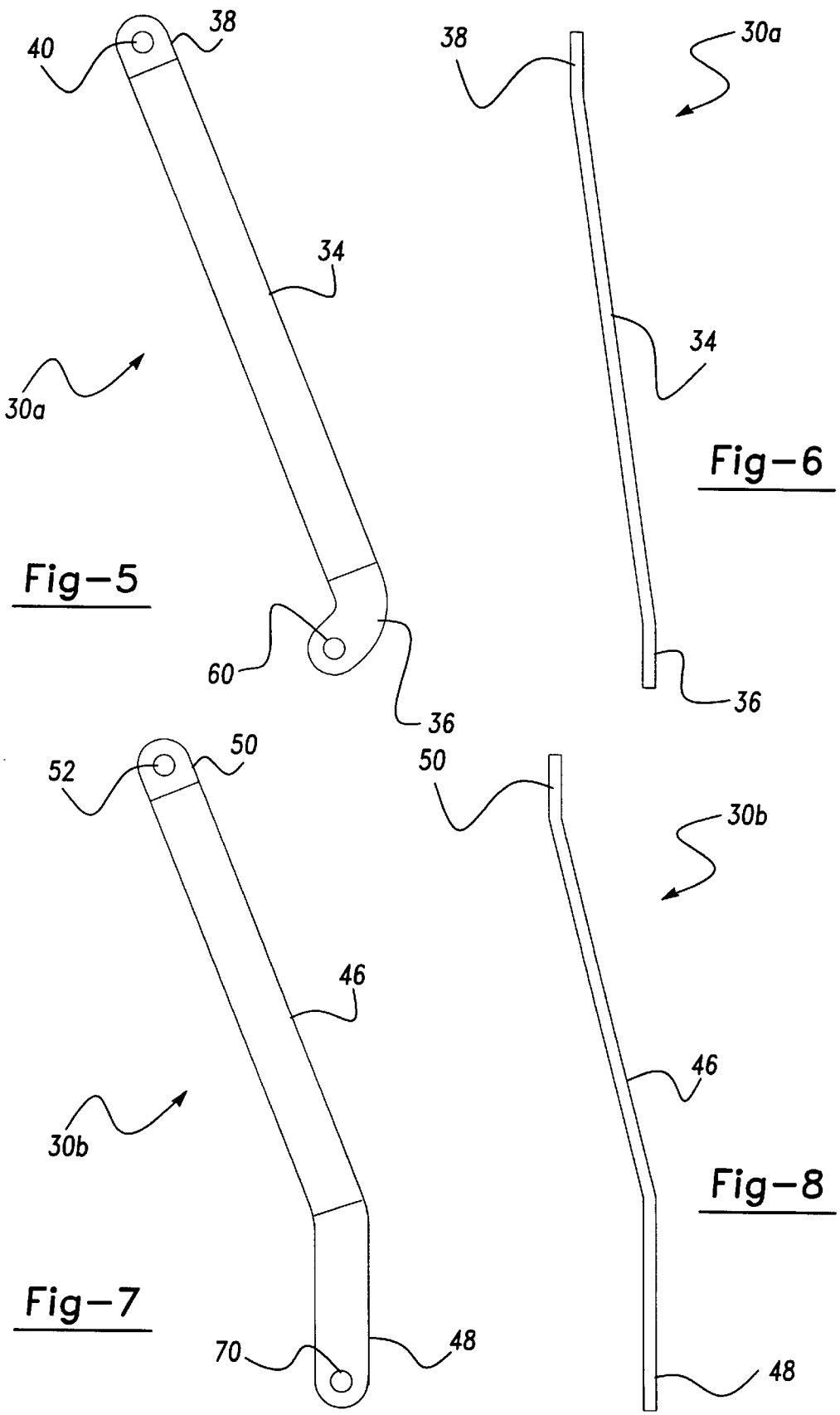

MOUNTING ARRANGEMENT FOR A WINDSHIELD OF A MOTOR VEHICLE

CROSS-REFERENCE TO RELATED APPLICATION

This application is a conventional application based on a provisional application filed Jan. 6, 1997 and assigned U.S. Ser. No. 60/035,769.

BACKGROUND OF THE INVENTION

1. Field of the Invention

The present invention generally relates to motor vehicles. More particularly, the present invention relates to a mounting arrangement for a windshield of a motor vehicle in which the windshield may articulate between a raised position and a lowered position.

2. Discussion

In typical operation of a motor vehicle, the comfort of the vehicle occupants is furthered by a generally upright windshield which serves to block or otherwise deflect wind and other elements. In certain situations, the occupants of a vehicle may desire removal of the windshield from a forward line of sight for purposes of unobstructing the occupant's view and access. The size and weight of a typical vehicle windshield and the structural integrity required render detachment of a windshield from the vehicle highly impracticable.

Previously, windshields have been mounted for simple rotation about a fixed axis between a raised position and a lowered position. For example, such a feature has been included on various vehicles manufactured and sold by the assignee of this application under the registered trademark Jeep®. In such a known arrangement, the vehicle windshield is mounted in a frame which is pivotally interconnected adjacent its lower edge to the vehicle body for rotation about a fixed horizontal axis. Through manual urging, the windshield may be rotated through approximately sixty degrees (60°) to a lowered position in which the windshield is supported by the vehicle hood.

This known type of mounting arrangement for a vehicle windshield has proven to be commercially successful. However, given the wide range of varying consumer preferences and vehicle uses, this prior arrangement is subject to modification. In this regard, where existing mounting arrangements are employed, movement of the windshield to a lowered position has required the vehicle operator to exit the vehicle. Additionally, known mounting arrangements for pivotally attaching vehicle windshields are not designed to be driven under a source of power. Furthermore, known mounting arrangements for vehicle windshields undesirably expose the inside of the vehicle windshield when the windshield is rotated to its lowered position, thereby subjecting it to dirt and the like.

Accordingly, it is desired to provide a mounting arrangement for a windshield of a motor vehicle which permits the windshield to articulate between a raised position and a lowered position which overcomes the disadvantages of prior mounting arrangements.

SUMMARY OF THE INVENTION

It is a principal object of the present invention to provide a mounting arrangement for a windshield for a motor vehicle in which the windshield may be articulated from a raised position to a lowered position such that the inner side of the windshield is immediately adjacent the vehicle hood when the windshield is in its lowered position.

It is a related object of the present invention to provide a mounting arrangement for a windshield of a motor vehicle which includes control linkage for articulating the windshield relative to the body of the vehicle for between a raised position and a lowered position such that a lower edge of the windshield is advanced in a forward direction as an upper edge of the windshield is advanced in a downward direction.

It is another object of the present invention to provide such a mounting arrangement for a motor vehicle windshield in which the control linkage is substantially positioned subadjacent the windshield when the windshield is articulated to its lowered position.

It is yet another object of the present invention to provide a mounting arrangement for a windshield of a motor vehicle which has first and second control links operative for articulating the windshield between its raised position and its lowered position under a source of power.

As will become apparent below, the present invention comprises an improvement over previously known mounting arrangements for windshields of motor vehicle, including but not limited to the type discussed above, by satisfying the above-noted objects.

In one form, the present invention provides a mounting arrangement for a windshield of a motor vehicle which has a body and hood. The mounting arrangement includes a first control link and a second control link. The first control link has a first end pivotally interconnected to the vehicle of the body and a second end pivotally interconnected to the windshield. The second control link similarly has a first end pivotally interconnected to the vehicle body and a second end pivotally interconnected to the windshield. The first and second control links cooperate to articulate the windshield between a raised position and a lowered position such that an inner side of the windshield faces the hood of the vehicle when the windshield is in its lowered position.

In a more preferred form, the present invention provides a mounting arrangement for a windshield of a motor vehicle having a body which includes a first pair of control links and a second pair of control links. The first pair of control links includes first and second control links, both of which have a first end pivotally interconnected to the body of the motor vehicle and a second end pivotally interconnected to the windshield. The second pair of control links includes third and fourth control links which similarly both include a first end pivotally interconnected to the body of the motor vehicle and a second end pivotally interconnected to the windshield. The mounting arrangement further includes a drive mechanism connected to the first end of the first control link and the first end of the third control link. The drive mechanism is operable for driving the windshield between a raised position and a lowered position.

In the preferred embodiment, the drive mechanism includes a drive shaft having a first end fixedly attached to the first end of the first control link and a second end fixedly attached to the first end of the third control link. The drive mechanism also includes a drive motor operatively engaged with the drive shaft. In one suitable arrangement, the drive mechanism further includes a first gear interconnected to the drive motor and a second gear carried by the drive shaft. The second gear is in intermeshing relationship with the first gear and has a reduced diameter compared to the first gear, thereby providing a mechanical advantage.

BRIEF DESCRIPTION OF THE DRAWINGS

Additional objects and advantages of the present invention will become apparent from a reading of the following detailed description of the preferred embodiment which makes reference to the drawings of which:

FIG. 5 is a side view of a first drive link of the first pair of drive links of the mounting arrangement;

FIG. 6 is a front view of the first drive link;

FIG. 7 is a side view of a second drive link of the first pair of drive links of the mounting arrangement;

FIG. 8 is a front view of the second drive link;

DETAILED DESCRIPTION OF THE PREFERRED EMBODIMENT

Figure 1:
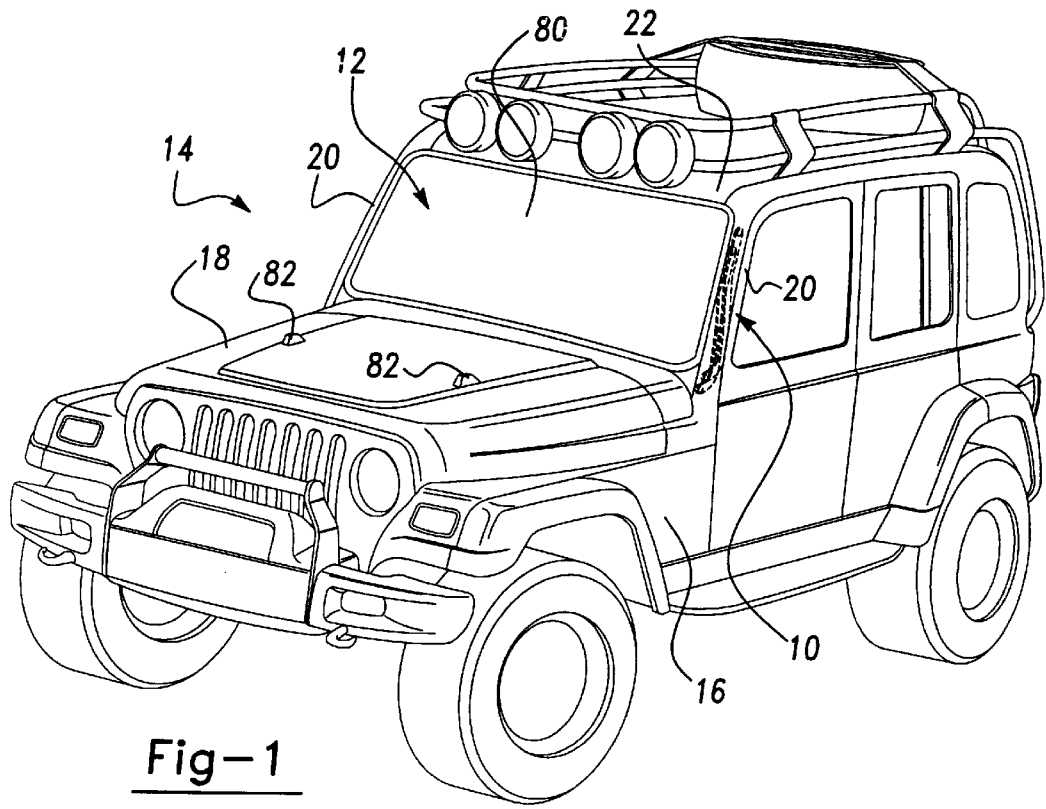
FIG. 1 is a front perspective view of an exemplary motor vehicle incorporating a mounting arrangement for a vehicle windshield constructed in accordance with a preferred embodiment of the present invention, the windshield of the vehicle shown articulated to a raised position.
Figure 2:
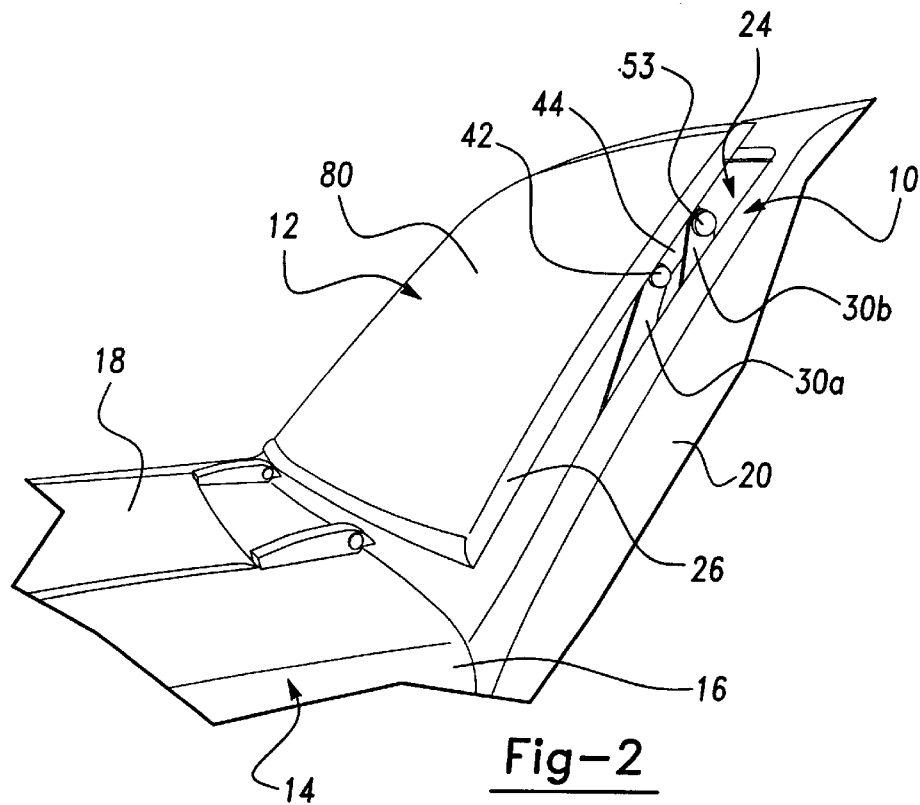
FIG. 2 is an enlarged perspective view of a portion of the vehicle of FIG. 1, illustrating the windshield as it begins to articulate from its raised position.
Figure 3:
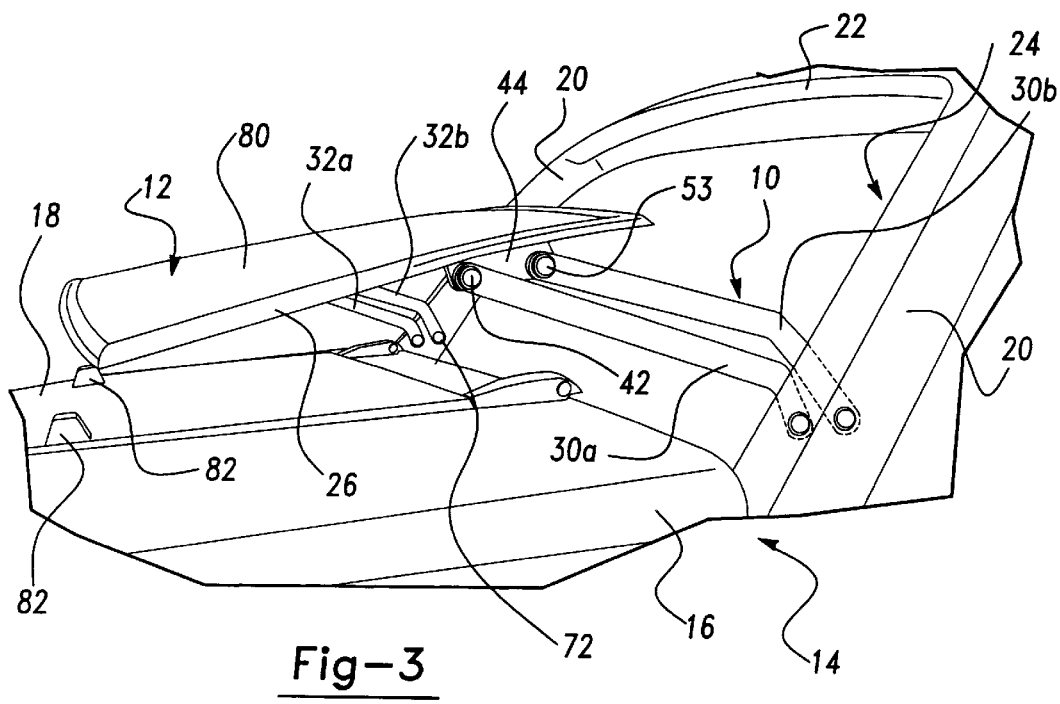
FIG. 3 is a perspective view similar to FIG. 2, illustrating the windshield articulated to an intermediate position.
Figure 4:
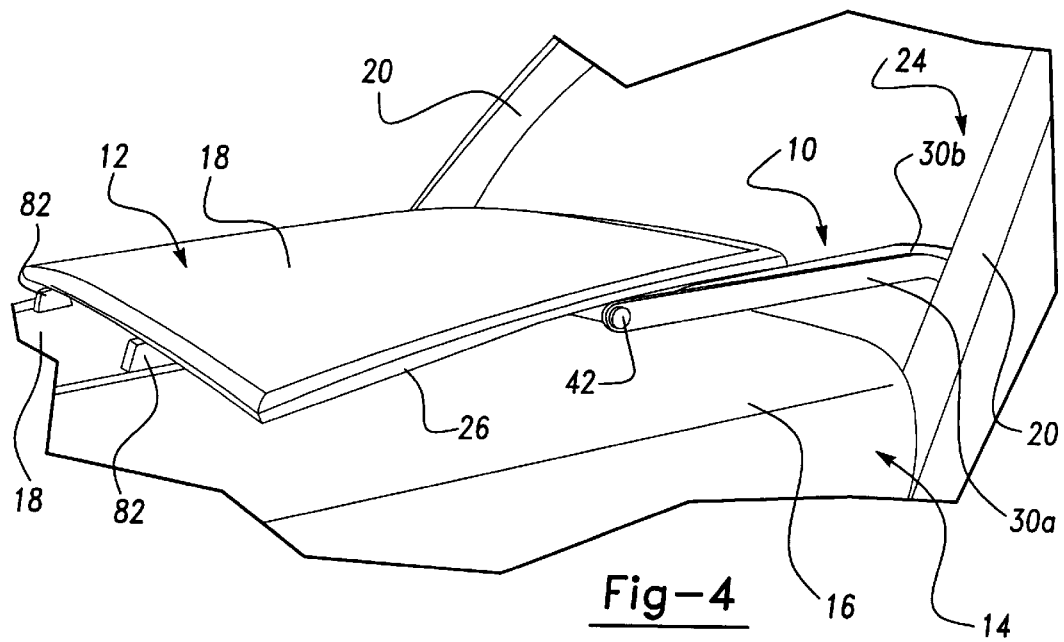
FIG. 4 is another perspective view similar to FIG. 2, illustrating the windshield articulated to a lowered position.

Referring generally to FIGS. 1 through 8 of the drawings, a windshield mounting arrangement for a motor vehicle constructed in accordance with the teachings of the present invention is shown and generally identified by reference numeral 10. As illustrated, the mounting arrangement 10 is adapted to interconnect a windshield 12 of an exemplary motor vehicle 14 with the body 16 of the motor vehicle 14 for articulation between a raised position and a lowered position. FIG. 1 illustrates the raised position of the windshield 12 with components of the mounting arrangements 10 shown in broken lines. The lowered position of the windshield 12 is illustrated in FIG. 4, in which the windshield 12 is positioned adjacent to the hood 18 of the vehicle 14.

Insofar as the present invention is concerned, the body 16 of the motor vehicle 14 is generally conventional in construction, including a hood 18, a pair of upwardly extending A-pillars 20 and a roof 22. The pair of upwardly extending A-pillars 20 and a forward portion of the roof 22 cooperate to partially define a windshield opening 24. The windshield 12 of the motor vehicle 14 transversely extends between the A-pillars 20. A seal 26 circumferentially surrounds the perimeter of the windshield 12 which operates to prevent air, moisture and the like from entering the passenger compartment of the motor vehicle 14 when the windshield 12 is in its raised position as shown in FIG. 1.

As generally shown in FIGS. 1 through 8, the mounting arrangement 10 of the present invention includes control linkage which has a first pair of control links 30. In the exemplary embodiment illustrated, the first pair of control links 30 operate to interconnect the driver's side A-pillar 20 with an adjacent portion of the windshield 12. In the preferred embodiment, the mounting arrangement 10 further includes a second pair of control links 32. The second pair of control links 32 similarly interconnects the passenger side A-pillar 20 and the windshield 12. The second pair of control links 30 is substantially identical to the first pair of control links 32.

As will become more apparent below, the first and second pair of control links 30 and 32 both include a first control link 30a and 32a which serves as a drive link for urging the windshield between its raised and lowered positions. The first control links 30a and 32a cooperate with a second control link 30b of the first pair 30 and a second control link 32b of the second pair 32 to articulate the windshield 12 through a predetermined path. It will be understood by those skilled in the art that the construction and operation of the second pair of control links 32 may be understood from the description of the first pair of control links 30 which follows.

Much of the remainder of this description will focus upon the interrelationship between the first and second pairs of control links 30 and 32 as they collectively cooperate to articulate the windshield 12 between its raised position and lowered position. As will become apparent below, the mounting arrangement 10 of the present invention provides an arrangement that supports the windshield 12 for movement about a transitory axis of rotation between the raised position and the lowered position relative to the hood 18 of the vehicle 14.

With specific reference to FIGS. 5 and 6, the first control link 30a of the first pair of control links will be described. The first control link 30a includes a generally planer central portion 34 which interconnects a first end 36 and a second end 38. The first end 36 is arcuate in side view so as to provide a mounting portion offset from an axis defined by the central portion 34. The second end 38 is formed to include an aperture 40 which receives a pivot pin 42 for interconnecting the first control link 30a with the windshield 12. The pivot pin 42 passes through the aperture 40 and fixedly engages a mounting flange 44 extending from the windshield 12. As shown in the front view of FIG. 6, the first and second ends 36 and 38 of the first control link 30a are angled relative to the central portion 34 such that they provide planer mounting portions located in substantially parallel, spaced apart planes.

With specific reference to FIGS. 7 and 8, the second control link 30b of the first pair will now be described. As with the first control link 30a, the second control link 30b includes a central portion 46 which interconnects a first end 48 with a second end 50. As shown in the side view of FIG. 7, the first end 48 of the second control link 30b is shown to be substantially linear and significantly longer than the first end 36 of the first control link 30a. The second end 50 of the second control link 30b is substantially identical to the second end 38 of the first control link 30a and includes an aperture 52 for receiving a pivot pin 53 which engages the mounting flange 44. As with the first control link 30a, the first and second ends 48 and 50 of the second control link 30b are angled relative to the central portion 46 such that they reside in substantially parallel, spaced apart planes.

Figure 9:
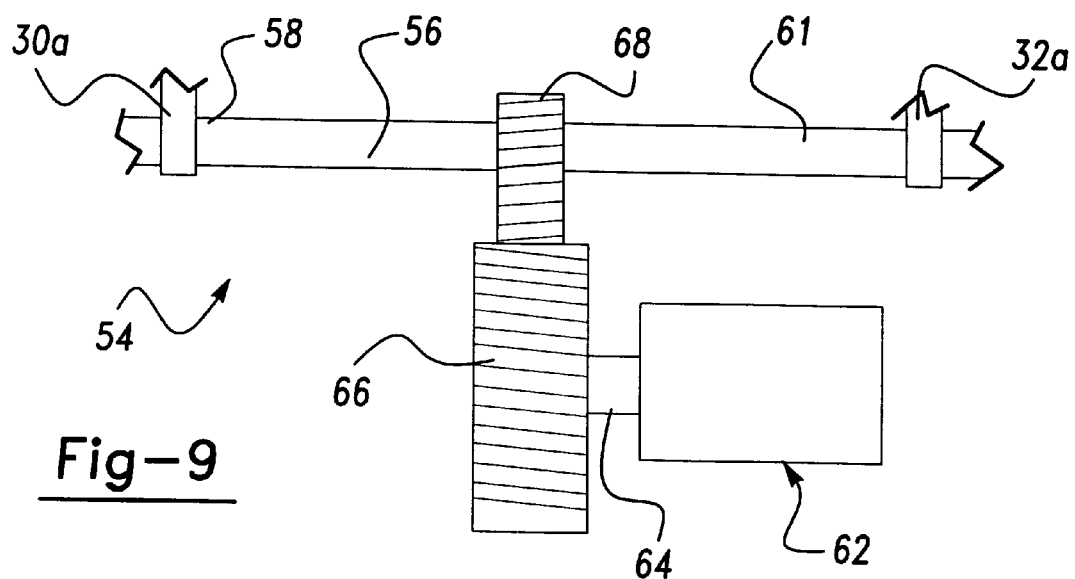
FIG. 9 is a simplified view showing an exemplary drive mechanism for controlling the articulation of the windshield under a source of power.

With reference to the simplified view of FIG. 9, the windshield mounting arrangement 10 of the present invention is shown to further include a drive mechanism 54 for articulating the windshield 12 between its raised and lowered positions under a source of power. In the exemplary form illustrated, the drive mechanism 54 includes a shaft 56 having a first end 58 which passes through an aperture 60 formed in the first end 36 of the first control link 30a of the first pair 30. The shaft 56 further includes a second end 61 which passes through a similar aperture 60 formed in the first end 36 of the first control link 32a of the second pair 32. The first and second ends 58 and 61 of the shaft 56 are pivotally interconnected with the body 16 of the vehicle 14 through bushings (not shown) carried by the vehicle A-pillars 20.

The drive mechanism 54 is shown to further include an electric motor 62 adapted to be driven by the vehicle electrical system (not shown). The motor 62 includes an output shaft 64 which carries an output gear 66. The output gear 66 is in intermeshing relationship with a reduction gear 68 of reduced diameter which is carried by the shaft 56. The relative dimensions of the output gear 66 and reduction gear 68 provide a mechanical advantage for driving the shaft 56.

The second end 48 of the second control links 30b and 32b are formed to include apertures 70. The apertures 70 receive pivot pins 72 (shown in FIG. 3) which operate to pivotally interconnect the second control links 30b and 32b with their respective A-pillar 20.

In the exemplary embodiment illustrated, the motor 62 is actuated in a conventional manner such as by a remote control device (not shown). Alternatively, a manually activated button (not shown) can be provided in the passenger compartment of the vehicle 14 for controlling the motor 62. While the preferred embodiment of the present invention has been described to include the drive mechanism 54, it will be understood by those skilled in the art that in certain applications it may be desired to modify the support mechanism 10 such that the windshield 12 can be manually operable for displacement between its raised position and lowered position.

Figure 10:
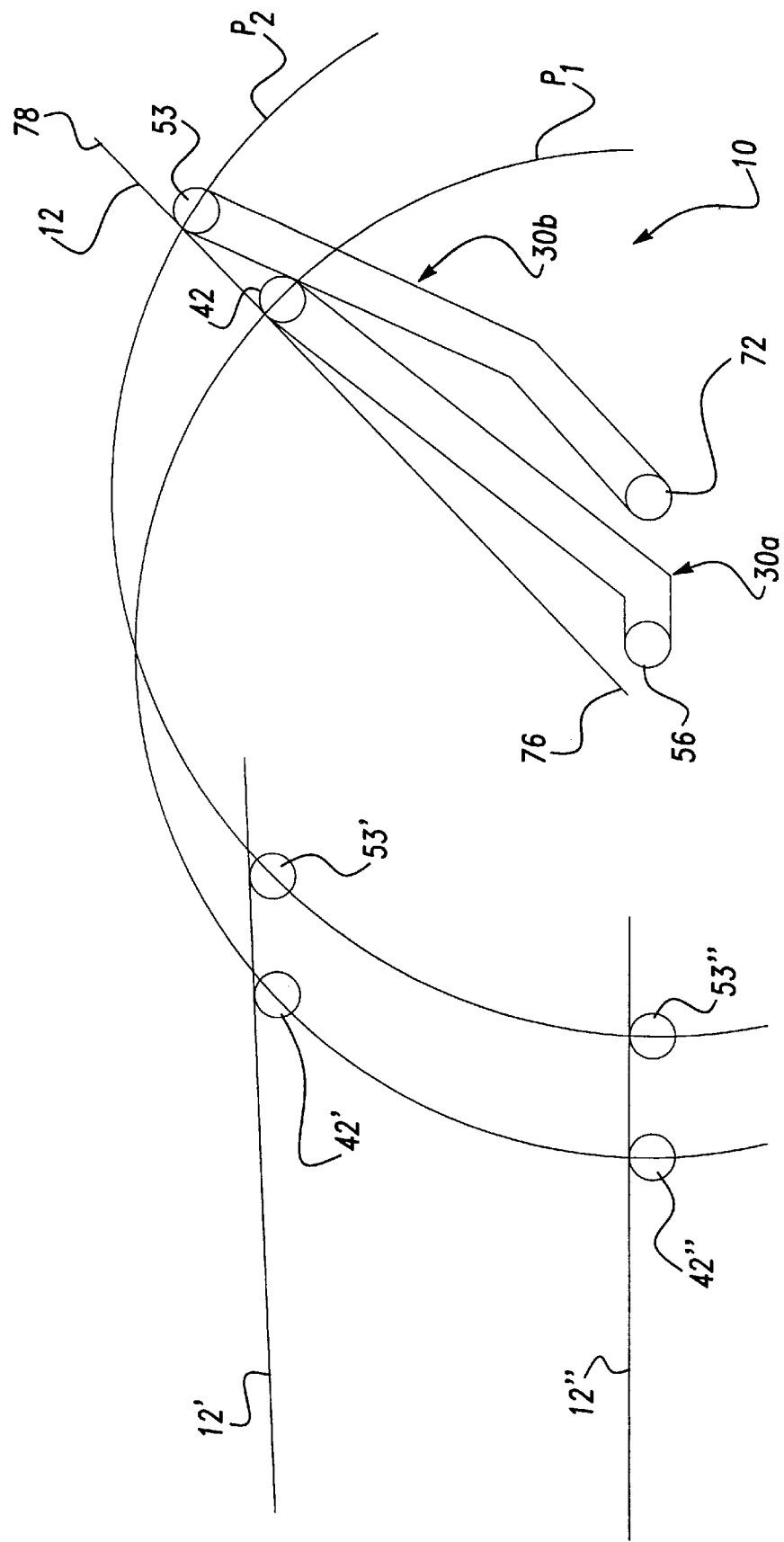
FIG. 10 is a schematic representation of the first pair of drive links illustrating the windshield as it is articulated between its raised position to its lowered position.

With additional reference to the schematic representation of FIG. 10, operation of the windshield mounting arrangement 10 of the present invention will be described. In FIG. 10, the windshield 12 is represented by a line as it is articulated between its raised, intermediate and lowered positions. In its intermediate position, which is similar to that shown in FIG. 3, the windshield 12 and the pivot pins 42 and 53 are identified with primed reference numerals. The lowered position of the windshield 12 and pivot pins 42 and 53, which is similar to that shown in FIG. 4, is identified in FIG. 10 with double primed reference numerals.

With the windshield 12 in its raised position, the first and second pairs of control links 30 and 32 are aligned with their respective A-pillar 20 adjacent an interior side thereof. Upon actuation of the motor 62, the drive shaft 56 rotates in a counterclockwise direction as shown in FIG. 10, causing the first control links 30a and 32a to correspondingly be driven to rotate in a counterclockwise direction. The pivot pins 42 which interconnect the second ends 38 of the first control links 30a and 30b with the windshield 12 follow a predetermined arcuate path $P_1$. The second control links 30b and 32b are similarly rotated in a counterclockwise direction. The pivot pins 53 which pivotally interconnect the second ends 50 of the second control links 30b and 32b with the windshield 12 follow a second predetermined arcuate path $P_2$. In the embodiment illustrated, the radii of curvature of both the first and second predetermined arcuate paths $P_1$ and $P_2$ are constant and substantially identical. However, it will be readily appreciated by those skilled in the art that certain applications may require modification to the relative dimensions.

As the windshield 12 is moved to its intermediate position, a lower edge 76 of the windshield 12 is advanced forwardly and upwardly. Simultaneously, an upper edge 78 of the windshield 12 moves forwardly and downwardly and the windshield 12 approaches a generally horizontal orientation. Through further operation of the motor 62, the windshield 12 is articulated to its lowered position adjacent the vehicle hood 18.

In the lowered position, the windshield 12" is oriented substantially horizontally and rests on a pair of supports 82 carried by the vehicle hood 18. The first and second pair of control links 30 and 32 are positioned substantially subadjacent the windshield 12 and thereby hidden from view. At this point, the inner side of the windshield 12 is disposed immediately adjacent the hood 18 and the outer side of the windshield 12 faces upwardly. As a result, an exterior side 80 of the windshield 12 is oriented upward. Thus, any debris that accumulates on the windshield 12 can be removed by the vehicle wiper system (not shown) when the windshield 12 is returned to its raised position.

Having described the operation of the present invention as the windshield 12 is articulated from its raised position to its lowered position, it will be appreciated by those skilled in the art that the process of moving the windshield 12 from its lowered position to its raised position is accomplished in reverse manner.

While the above detailed description describes the preferred embodiment of the present invention, it will be understood that the present invention is susceptible to modification, variation and alteration without deviating from the scope and fair meaning of the subjoined claims.

What is claimed is:

1. A mounting arrangement for a windshield of a motor vehicle, the motor vehicle having a body including a hood, the mounting arrangement comprising:

a first control link having a first end pivotally interconnected to the vehicle body and a second end pivotally interconnected to the windshield;

a second control link having a first end pivotally interconnected to the vehicle body and a second end pivotally interconnected to the windshield;

a drive shaft including a laterally extending axis and a first end fixedly attached to said first end of said first control link; and a drive motor operatively engaged with said drive shaft for rotating said drive shaft about said axis for articulating the windshield between a raised position and a lowered position;

said first and second control links being cooperatively operable to articulate the windshield between the raised position and the lowered position such that an inner side of the windshield faces the hood of the vehicle when the windshield is in the lowered position.

2. A mounting arrangement for a windshield of a motor vehicle, the motor vehicle having a body including a hood, the mounting arrangement comprising:

a first pair of control links including first and second control links, both of said first and second control links of said first pair of control links having a first end pivotally interconnected to the body of the motor vehicle and a second end pivotally interconnected to the windshield;

a second pair of control links including third and fourth control links, both of said third and fourth control links of said second pair of control links having a first end pivotally interconnected the body of the motor vehicle and a second end pivotally interconnected to the windshield; and a drive mechanism connected to said first end of said first control link and said first end of said third control link, said drive mechanism operable for driving the windshield between a raised position and a lowered position, said drive shaft including a first end fixedly attached to said first end of said first control link and a second end fixedly attached to said first end of said third control link, and a drive motor operatively engaged with said drive shaft.

3. The mounting arrangement for a windshield of a motor vehicle of claim 2, wherein said drive mechanism is operable for driving the windshield between the raised position and the lowered position such that an inner side of the windshield faces downward when the windshield is in the lowered position.

4. A mounting arrangement for a windshield of a motor vehicle, the motor vehicle having a body, the mounting arrangement comprising:

a first drive link having a first end pivotally interconnected to the body of the motor vehicle and a second end pivotally interconnected to the windshield;

a second drive link having a first end pivotally interconnected to the body of the motor vehicle and a second end pivotally interconnected to the windshield;

a drive shaft including a first end fixedly attached to said first end of said first drive link and a second end fixedly attached to said first end of said second drive link; and a drive motor operatively engaged with said drive shaft for rotating said drive shaft to articulate the windshield between a raised position and a lowered position.

5. The mounting arrangement for a windshield of a motor vehicle of claim 4, further including a first gear driven by said drive motor and a second gear carried by said drive shaft, said second gear in intermeshing relationship with said first gear and having a reduced diameter relative to said first gear.

6. The mounting arrangement for a windshield of a motor vehicle of claim 4, wherein said drive mechanism is operable for driving the windshield between the raised position and the lowered position such that an inner side of the windshield faces downward when the windshield is in the lowered position.

\* \* \* \* \*